US012675790B2

(12) United States Patent
Osborn et al.

(10) Patent No.: US 12,675,790 B2
(45) Date of Patent: Jul. 7, 2026

(54) SYSTEMS AND METHODS FOR VALIDATING TRANSACTIONS

(71) Applicant: Capital One Services, LLC, McLean, VA (US)

(72) Inventors: Kevin Osborn, Newton Highlands, MA (US); Srinivasa Chigurupati, Long Grove, IL (US); John Jones, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/407,937

(22) Filed: Jan. 9, 2024

(65) Prior Publication Data

US 2025/0225513 A1 Jul. 10, 2025

(51) Int. Cl.
*G06Q 20/40* (2012.01)
*G06Q 20/38* (2012.01)

(52) U.S. Cl.
CPC ....... *G06Q 20/401* (2013.01); *G06Q 20/3825* (2013.01); *G06Q 20/3827* (2013.01); *G06Q 20/3829* (2013.01); *G06Q 2220/00* (2013.01)

(58) Field of Classification Search
CPC ............. G06Q 20/401; G06Q 20/3825; G06Q 20/3827; G06Q 20/3829; G06Q 2220/00
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Federal Public Key Infrastructure Steering Committee Legal/Policy Working Group, "Records Management Guidance for PKI Digital Signature Authenticated and Secured Transaction Records", Mar. 11, 2005 (Year: 2005).*

(Continued)

*Primary Examiner* — Patrick McAtee
*Assistant Examiner* — Timothy Paul Sax
(74) *Attorney, Agent, or Firm* — KDW Firm PLLC; Andrew D. Kasnevich

(57) ABSTRACT

Systems and methods of validating transactions are provided. An exemplary system includes a server including a memory and a processor. The server is configured to: receive from an entity a transaction validation request of validating a transaction; validate the transaction; generate a logging record of the transaction validation; cryptographically hash the logging record to create a hashed logging record; digitally sign the hashed logging record using a key to create a signed hashed logging record; and transmit the signed hashed logging record to a computer device.

20 Claims, 6 Drawing Sheets

(56) References Cited

U.S. PATENT DOCUMENTS

| | | | |
|---|---|---|---|
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,449,734 B1 * | 9/2002 | Shrivastava ........ G06F 16/2365 |
| | | 714/4.11 |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |

(56)             References Cited

U.S. PATENT DOCUMENTS

| | | |
|---|---|---|
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,625 B2 * | 7/2017 | Lowe ..................... H04L 63/10 |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |

(56) References Cited

U.S. PATENT DOCUMENTS

| | | |
|---|---|---|
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0023877 A1* | 1/2003 | Luther .................... H04L 47/10 |
| | | 726/4 |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0177065 A1* | 8/2006 | Halbert ................ H04L 9/0662 |
| | | 380/277 |
| 2006/0242698 A1 | 10/2006 | Inskeep et al. |
| 2006/0280338 A1 | 12/2006 | Rabb |
| 2007/0011459 A1* | 1/2007 | Stapleton ............... H04L 63/12 |
| | | 713/178 |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0147559 A1* | 6/2008 | Cohen .................... G06Q 40/02 |
| | | 705/59 |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |

(56) References Cited

U.S. PATENT DOCUMENTS

| | | |
|---|---|---|
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0339125 A1* | 12/2013 | Mcintyre ............... G06K 15/00 705/14.38 |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0046679 A1* | 2/2017 | Gotlieb .................. G06Q 20/34 |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |

(56) References Cited

U.S. PATENT DOCUMENTS

| | | | |
|---|---|---|---|
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0308094 A1 | 10/2018 | Jayaram et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0102778 A1* | 4/2019 | Lebovic | G06Q 20/401 |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0135333 A1* | 4/2020 | Becker | G16H 40/40 |
| 2021/0004806 A1 | 1/2021 | Noe | |
| 2021/0075623 A1* | 3/2021 | Petersen | H04L 9/3297 |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0091686 A1 | 3/2023 | Nakaike et al. | |
| 2023/0096692 A1* | 3/2023 | Jacobs | H04W 12/041 380/270 |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| CN | 103023643 | 4/2013 | |
| CN | 103417202 | 12/2013 | |
| EP | 1 085 424 | 3/2001 | |
| EP | 1 223 565 | 7/2002 | |
| EP | 1 265 186 | 12/2002 | |
| EP | 1 783 919 | 5/2007 | |
| EP | 2 852 070 | 1/2009 | |
| EP | 2 139 196 | 12/2009 | |
| EP | 1 469 419 | 2/2012 | |
| GB | 2 457 221 | 8/2009 | |
| GB | 2 516 861 | 2/2015 | |
| GB | 2 551 907 | 1/2018 | |
| KR | 101508320 | 4/2015 | |
| KR | 20150140132 A | 12/2015 | |
| WO | 9910824 A1 | 3/1999 | |
| WO | WO 00/49586 | 8/2000 | |
| WO | WO 2006070189 | 7/2006 | |
| WO | WO 2008055170 | 5/2008 | |
| WO | WO 2009025605 | 2/2009 | |
| WO | WO 2010049252 | 5/2010 | |
| WO | WO 2011112158 | 9/2011 | |
| WO | WO 2012001624 | 1/2012 | |
| WO | WO 2013039395 | 3/2013 | |
| WO | WO 2013155562 | 10/2013 | |
| WO | WO 2013192358 | 12/2013 | |
| WO | WO 2014043278 | 3/2014 | |
| WO | WO 2014170741 | 10/2014 | |
| WO | WO 2015179649 | 11/2015 | |
| WO | WO 2015183818 | 12/2015 | |
| WO | WO 2016097718 | 6/2016 | |
| WO | WO 2016160816 | 10/2016 | |
| WO | WO 2016168394 | 10/2016 | |
| WO | 2017047855 A1 | 3/2017 | |
| WO | WO 2017042375 | 3/2017 | |
| WO | WO 2017042400 | 3/2017 | |
| WO | WO 2017157859 | 9/2017 | |
| WO | WO 2017208063 | 12/2017 | |
| WO | WO 2018063809 | 4/2018 | |
| WO | WO 2018137888 | 8/2018 | |
| WO | 2019022585 A1 | 1/2019 | |
| WO | 2021051884 A1 | 3/2021 | |
| WO | 2021133492 A1 | 7/2021 | |
| WO | 2022108959 A1 | 5/2022 | |
| WO | 2022109848 A1 | 6/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from

(56)　　　　　References Cited

OTHER PUBLICATIONS

Internet URL: https://www.emvco.com/wp-content/uploads/2017/05/EMV_v4.3 Book_2_Security and Key Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug BIG SEVEN open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL:

https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Author Unknown, "Global expansion of card tapping mobile OTP for security and convenience is imminent," Jun. 28, 2022, website: https://www.swidch.com/blogs/card-tapping-motp-blog.

Emvco, "EMV Card Personalisation Specification," Aug. 1, 2021, pp. 1-114, Retrieved from Internet URL:https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

The International Search Report and Written Opinion mailed Apr. 3, 2025 for Int. App. No. PCT/US2025/010514 (14 pages).

* cited by examiner

200

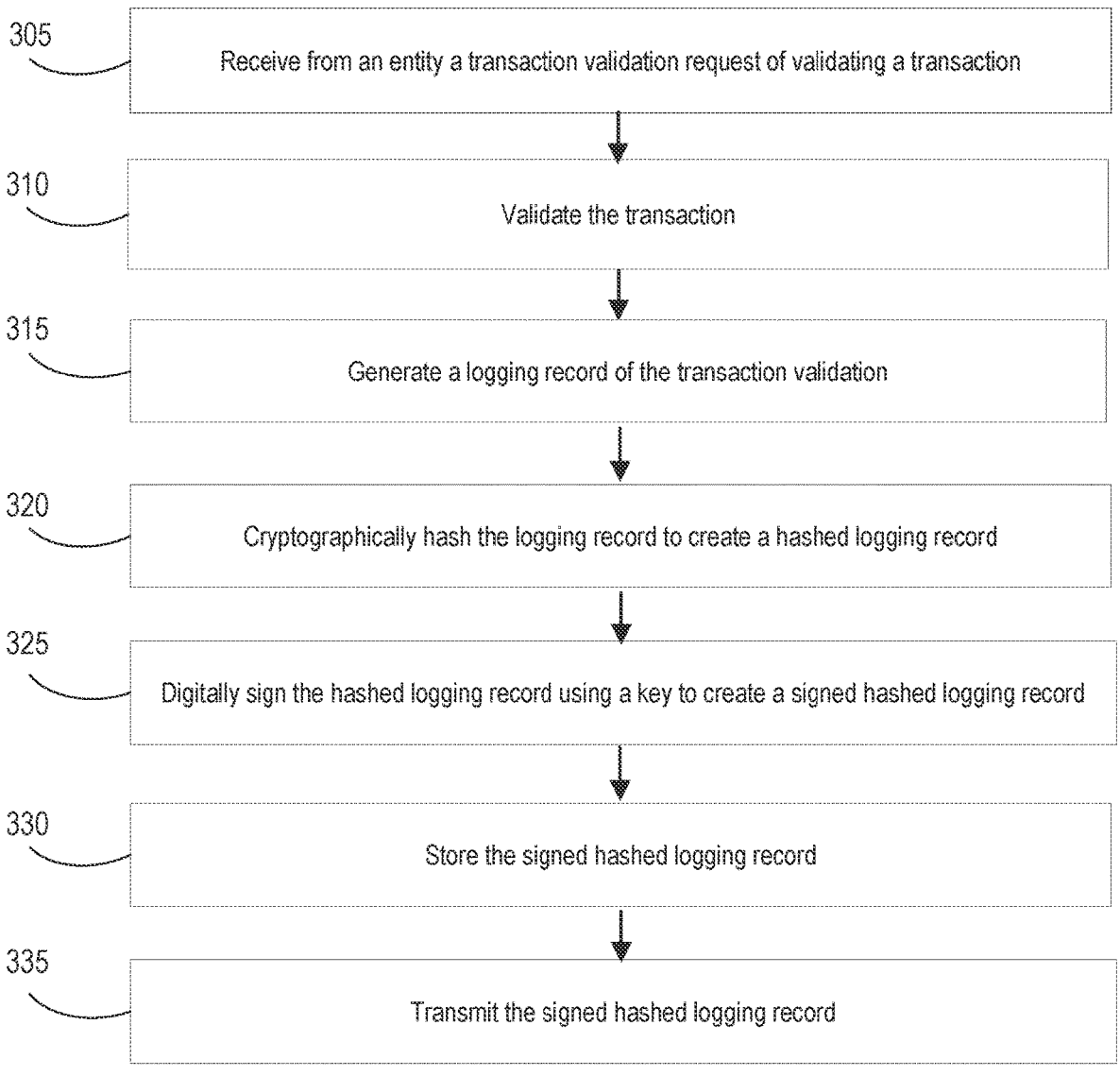

305  Receive from an entity a transaction validation request of validating a transaction 310  Validate the transaction 315  Generate a logging record of the transaction validation 320  Cryptographically hash the logging record to create a hashed logging record 325  Digitally sign the hashed logging record using a key to create a signed hashed logging record 330  Store the signed hashed logging record 335  Transmit the signed hashed logging record

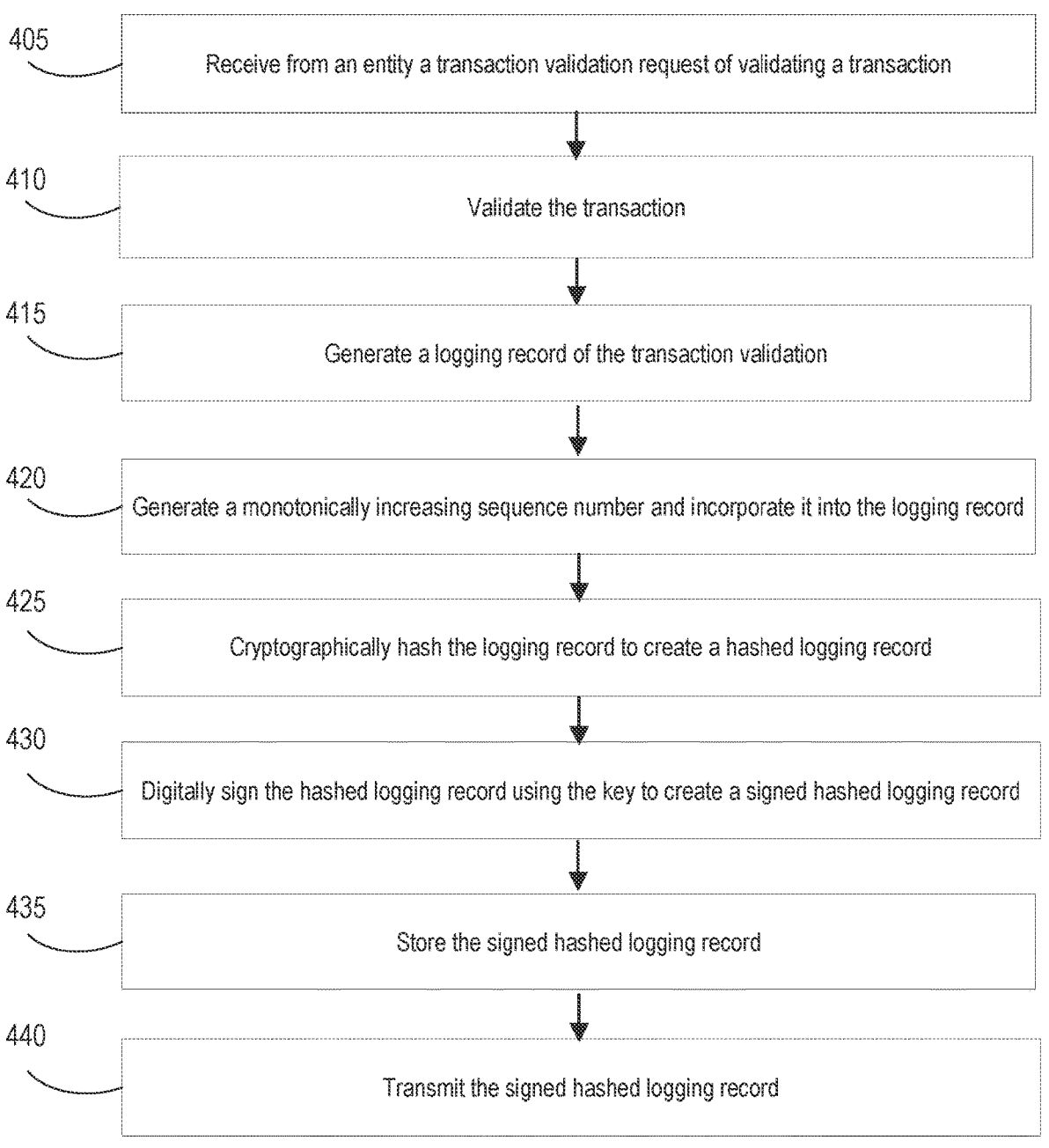

405 — Receive from an entity a transaction validation request of validating a transaction 410 — Validate the transaction 415 — Generate a logging record of the transaction validation 420 — Generate a monotonically increasing sequence number and incorporate it into the logging record 425 — Cryptographically hash the logging record to create a hashed logging record 430 — Digitally sign the hashed logging record using the key to create a signed hashed logging record 435 — Store the signed hashed logging record 440 — Transmit the signed hashed logging record

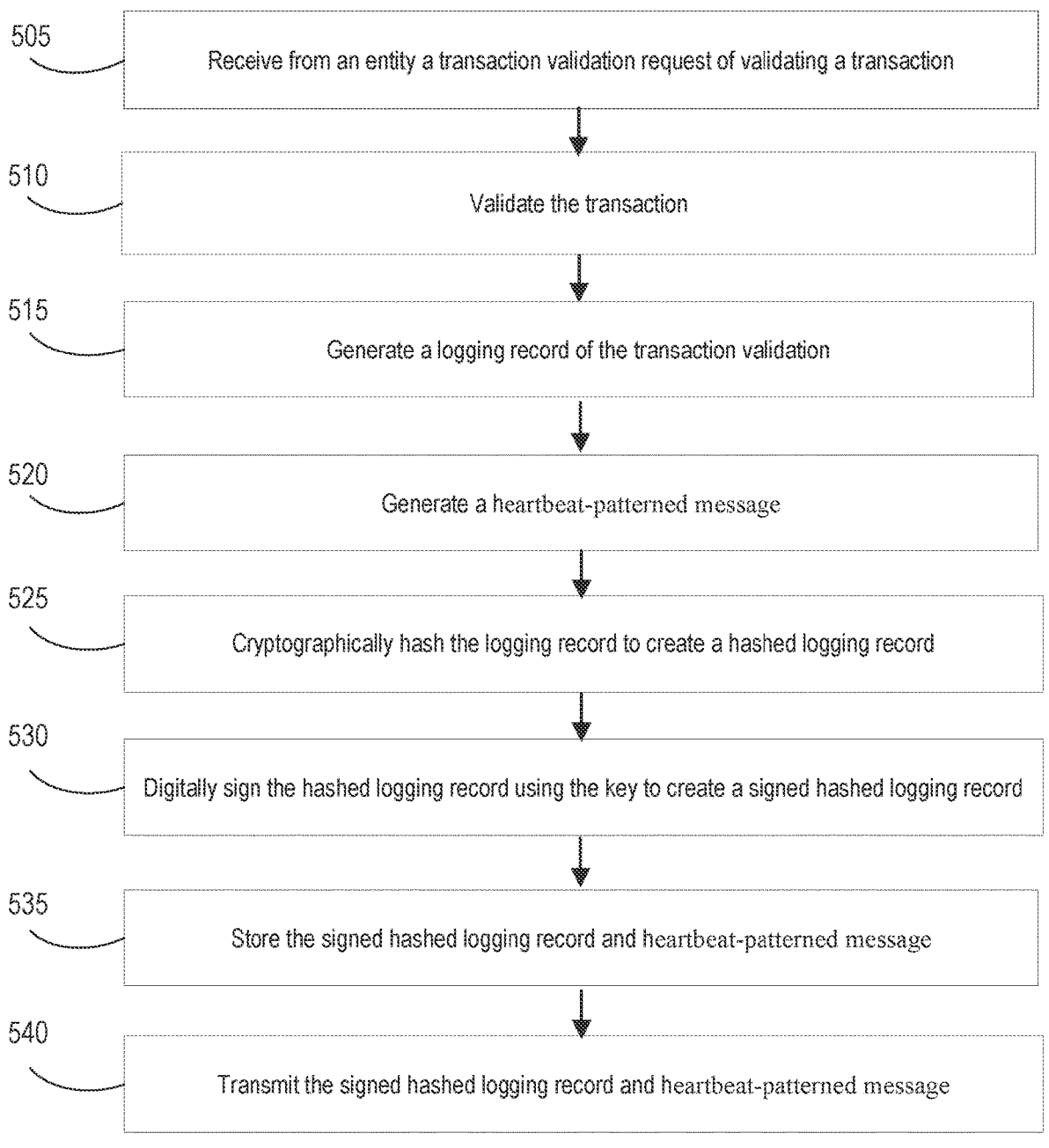

505   Receive from an entity a transaction validation request of validating a transaction 510   Validate the transaction 515   Generate a logging record of the transaction validation 520   Generate a heartbeat-patterned message 525   Cryptographically hash the logging record to create a hashed logging record 530   Digitally sign the hashed logging record using the key to create a signed hashed logging record 535   Store the signed hashed logging record and heartbeat-patterned message 540   Transmit the signed hashed logging record and heartbeat-patterned message

| 605 | 610 | 615 |
| --- | --- | --- |
| Field | Type | Description |
| eventID | int64 | Snowflake ID representing unique event |
| timestamp | timestamp | Timestamp of event |
| eventType | string | Type of event ("heartbeat", "tap", etc.) |
| transactionDetails | object | Details of transactions requested by client |
| status | string | Status (success, error, etc.) of the result |
| hash | string | SHA256 of the previous row's hash plus this row's contents concatenated to a string |

SYSTEMS AND METHODS FOR VALIDATING TRANSACTIONS

FIELD OF THE INVENTION

The present disclosure relates generally to transaction validation, and more particularly, to systems and methods for validating transactions.

BACKGROUND

In transaction validations, transaction validations provided by a service that is run in a third party's computing environment are required to be reliably metered for service billing purposes. Different third entities can be running validation services, and it is desirable to be able to actually collect login information that can be useful to monitor the usage of the service for both billing purposes and monitoring of operational status. The operational status, for example, can include whether the service is being turned off, whether a transaction is being routed to a different place, and so forth.

Accordingly, there is a need to provide systems and methods that can manage the usage of the transaction validation service for billing purposes and to ensure that users are in compliance and consistent with the terms of service.

SUMMARY

Aspects of the disclosed technology include systems and methods of validating transactions.

Embodiments of the present disclosure provide a system of validating transactions. The system can include a server including a memory and a processor. The server can be configured to: receive from an entity a transaction validation request of validating a transaction; validate the transaction; generate a logging record of the transaction validation; cryptographically hash the logging record to create a hashed logging record; digitally sign the hashed logging record using a key to create a signed hashed logging record; and transmit the signed hashed logging record to a computer device.

Embodiments of the present disclosure provide a method of validating transactions performed by a server. The method can include: receiving from an entity a transaction validation request of validating a transaction; validating the transaction; generating a logging record of the transaction validation; cryptographically hashing the logging record to create a hashed logging record; digitally signing the hashed logging record using a key to create a signed hashed logging record; and transmitting the signed hashed logging record to a computer device.

Embodiments of the present disclosure provide a non-transitory, computer-readable medium comprising instructions for validating transactions that, when executed on a computer arrangement, cause the computer arrangement to perform actions including: receiving from an entity a transaction validation request of validating a transaction; validating the transaction; generating a logging record of the transaction validation; cryptographically hashing the logging record to create a hashed logging record; digitally signing the hashed logging record using a key to create a signed hashed logging record; and transmitting the signed hashed logging record to a computer device.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 3 is a flow chart of a method of transaction validation according to an example embodiment.

FIG. 4 is a flow chart of a method of transaction validation according to an example embodiment.

FIG. 5 is a flow chart of a method of transaction validation according to an example embodiment.

FIG. 6 illustrates an exemplary logging record generated during transaction validation according to an example embodiment.

DETAILED DESCRIPTION OF EXAMPLE EMBODIMENTS

Figure 1:
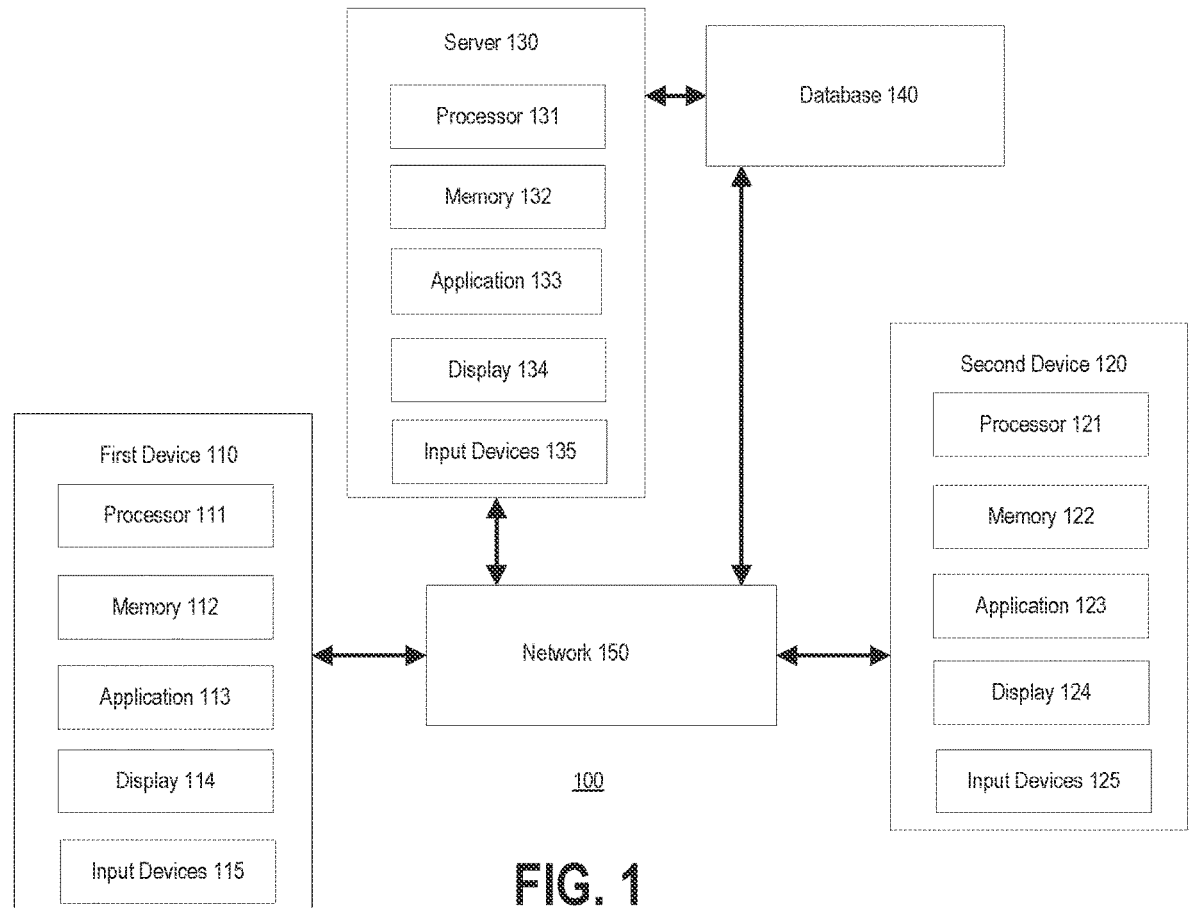
FIG. 1 is a diagram of a system of transaction validation according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

In some embodiments, transaction validation can be deployed as a black box service. Embedded in the service can be a creation of logging records which can be delivered in real time, or batch later either through File logging, or messaging service. Each usage of the transaction validation service can be logged and a cryptographic secure hash can be created for each logging record. That hash can be signed by a key accessible to the service (e.g. the key is managed by a hardware security module (HSM) which the client's server has access to for performing cryptographic functions, but not able to access the keys directly.)

In some embodiments, the hash can be signed with a public key embedded and obfuscated in the code. The transaction validation service can be designed as services which can be licensed. on a per use fee basis. In order to do this, a reliable, secure and not intrusive mechanism can be used. The present disclosure discloses herein a logging mechanism with special cryptographic hashes on each logging record to detect tampering. Each logging record can contain a monotonically increasing sequence number, which can be used to detect missing sequence calls (e.g. trying to cheat by removing usage calls.) This can further be improved by including a hash of hashes of the previous logging records up to that point.

In some embodiments, the transaction validation service can be decoupled from other infrastructure, so that the transaction validation service can operate and report back, occasionally that it is up and running but not have to necessarily phone home to prove that it is operating.

The reporting or delivery mechanism of the hashed logging records can be flexible, for example, it can be done in a streaming matter. The hashed logging records can be reported directly or they can be delivered in batches of records. Whatever that delivery mechanism is, the actual mode of compiling those logging records has integrity and that integrity is assembled by creating a chain of hashes, so that each hashed logging record is a hash of the current record plus the previous record, which includes the previous record's hash.

In some embodiments, the hashed logging record is signed with a key. This digital signature can allow to verify that the logging record is untampered with and that the logging record is produced by the transaction validation service.

In some embodiments, a heartbeat pattern message can be included in the hashed logging record to detect the anomaly of the transaction validation service. For the heartbeat pattern message, at a regular interval, a message would be produced whether or not any transaction validation had occurred. This can allow monitoring for the up time of the transaction validation service, as opposed to just how many transaction validations had occurred. For example, if transaction validations are redirected or the transaction validation service is turned off, that can be detected by looking at the frequency of these heartbeat messages. If there have an anomaly or a gap in the heartbeat messages, and they are not at the regular interval, then the transaction validation service can be detected to have been down for some time. The heartbeat messages are non-transactional heartbeat records that can be a part of the immutable hash-tree record. This way it can detect if transaction validations were just skipped, or if the server on which the transaction validation service is deployed is continuously active. This heartbeat message can also include a monotonically increasing counter plus a timecode. This heartbeat message can be a record that is intrinsic to the transaction validation system itself and is not tied to a specific transaction and contains a timestamp. The heartbeat message occurs at a regular interval. The regular interval can be defined inside the heartbeat record itself or it can be something that is understood externally and implicit in the heartbeat record. For example, the interval can be operationally significant time frames, such as short enough to not represent a significant loss of traffic and long enough to not produce too much data.

The logging record may refer to transactional records. The transaction record can include a particular action or event that was called on the server of the transaction validation service. It can include an event identification (ID), the type of event that happened, and any kind of metadata with that event. The event ID may indicate what type of event occurred, for example, a key validation has occurred. There may have metadata that is associated with that event, which can provide details about that event. Those details can include the details of the transaction itself. The metadata may also include which card issuer is using the transaction validation service.

In some embodiment, the event ID can be a snowflake ID. The snowflake ID is a way to generate a unique ID that is full ordered from a timestamp point but unique enough. That snowflake ID is generated by parallel systems that are not duplicated. Through the timestamp, event details can be obtained, such as when the event occurred, the event type, the transaction details, and the transaction validation result. Those details can then be hashed plus the previous record's hash. The hash can be signed by a private key or a public key and then verified by the corresponding key.

The public key may be obfuscated in the code for the transaction validation service. When the code is packaged and shipped to the third party's server, the code itself would be obfuscated, so that the public key would be difficult to find. The public key can be stored in parts and assembled by the code. In some embodiments, the transaction validation service may call out to a signing service to have the hashed logging record signed, such as a physical key.

FIG. 1 illustrates a system 100 of transaction validation according to an example embodiment. As further discussed below, the system 100 may include a first device 110, a second device 120, a server 130, and a database 140 in communication using a network 150. Although FIG. 1 illustrates single instances of the components, the system 100 may include any number of components.

The first device 110 may be associated with a financial institution that provides the code or software program of transaction validation.

The first device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first device 110 may include a processor 111, a memory 112, and an application 113. The processor 111 may be a processor, a microprocessor, or other processor, and the first device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the first device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's financial account information.

The application 113 may comprise one or more software applications comprising instructions for execution on the first device 110. In some examples, the first device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described herein. Such processes may be implemented in software, such as software modules, for execution by computers or other machines. The application 113 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the first device 110 that is available and supported by the first device 110, such as a touch-screen, keyboard, mouse, cursor-control device, microphone, digital camera, video recorder or camcorder. These devices may be used to enter information and interact with the software and other devices described herein.

The second device 120 can be associated with another financial institution that can issue various payment instruments to users and request transaction validation service performed using the code or software program of transaction validation.

The second device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 120 may include a processor 121, a memory 122, an application 123, a display 124, and input devices 125. The processor 121 may be a processor, a microprocessor, or other processor, and the second device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the second device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as private and personal information.

The application 123 may comprise one or more software applications comprising instructions for execution on the second device 120. In some examples, the second device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described herein. Such processes may be implemented in software, such as software modules, for execution by computers or other machines. The application 123 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The second device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the second device 120 that is available and supported by the second device 120, such as a touch-screen, keyboard, mouse, cursor-control device, microphone, digital camera, video recorder or camcorder. These devices may be used to enter information and interact with the software and other devices described herein such as selecting an option of creating an online account with the merchant.

The server 130 may be associated with a third party who runs the transaction validation service using the code or software program of transaction validation, and can be configured to communicate with the first device 110 and/or the second device 120.

The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's financial account information and the contactless card information.

The application 133 may comprise one or more software applications comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described herein. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

The database 140 may be one or more databases configured to store date, including without limitation, private information of users, financial accounts of users, and transactions of users. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the first device 110, the second device 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first device 110, server 130, and second device 120 using the network 150 can occur using one or more front channels and one or more secure back channels. A front channel may be a communication protocol that employs a publicly accessible and/or unsecured communication channel such that a communication sent to the first device 110, server 130, and/or second device 120 may originate from any other device, whether known or unknown to the first device 110, server 130, and/or second device 120, if that device possesses the address (e.g., network address, Internet Protocol (IP) address) of the first device 110, server 130, and/or second device 120. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first device 110, server 130, and/or second device 120 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
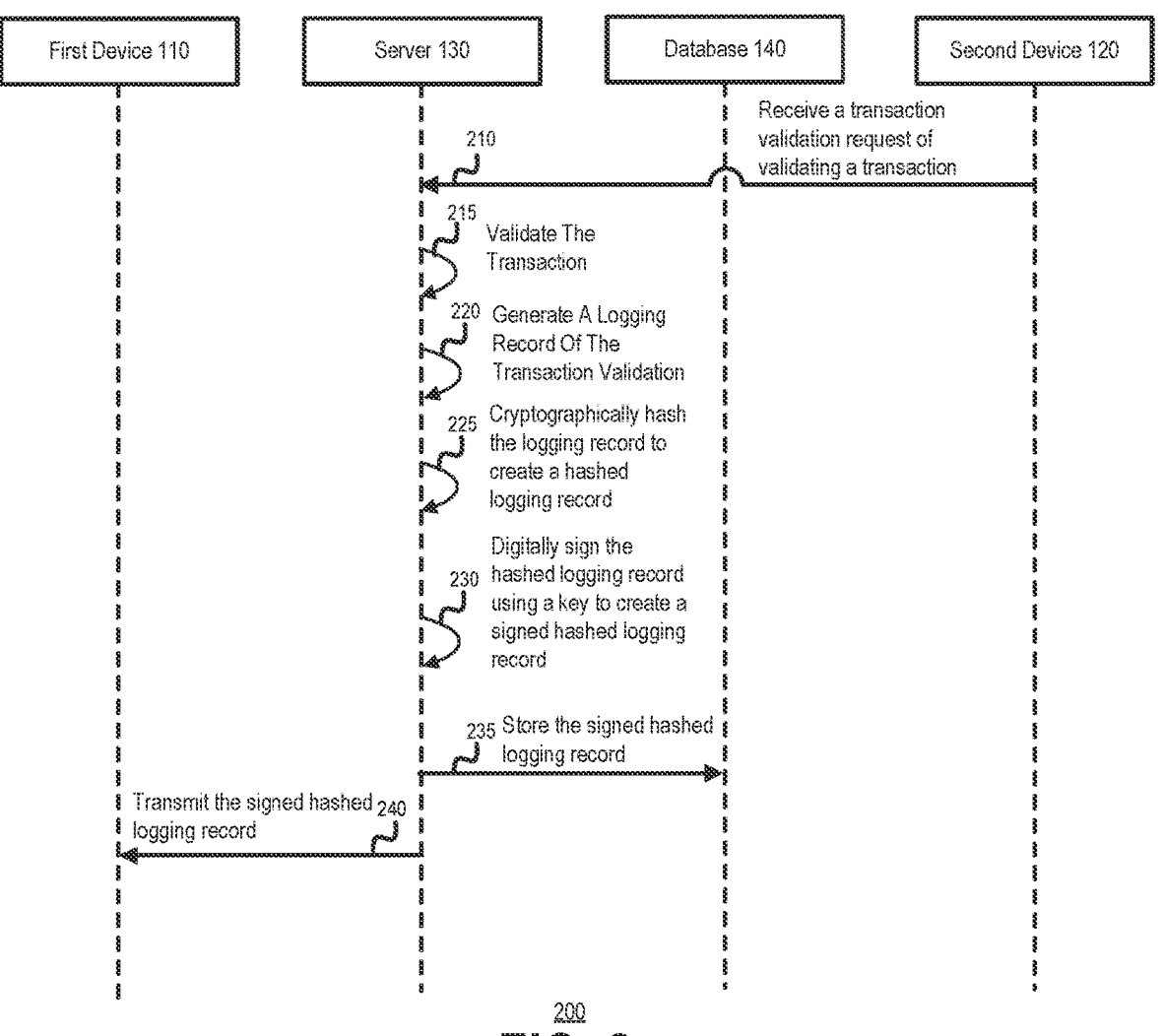
FIG. 2 is a diagram of sequential interactions between components of the system in FIG. 1 according to an example embodiment.

FIG. 2 illustrates an example diagram 200 of sequence interaction between the components of the system 100 according to an example embodiment. FIG. 2 may reference the same or similar components as those illustrated in FIG. 1, including a first device, a server, a database, and a second device.

The financial institution, such as a bank, associated with the second device 120 may issue contactless cards to its customers. The customers may use the contactless cards to conduct various transactions, such as online purchases. When the second device 120 receive a transaction from a customer. The second device 120 may transmit the transaction validation request to the server 130 on which the transaction validation service software program is deployed. Accordingly, at step 210, the server 130 receive a transaction validation request of validating a transaction from the second device 120.

At step 215, the server 130 may validate the transaction. The transaction validation request can include information about a contactless card used for the transaction. The validation can include validating a cryptogram generated by the contactless card when the transaction is being conducted.

At step 220, the server 130 may generate a logging record of the transaction validation. The logging record can include the transaction information, the contactless card information, the issuer of the contactless card, a monotonically increased number indicative of a sequence number of the transaction validation request, a timestamp indicative of a time at which the transaction validation request is being received and processed, and so forth.

At step 225, the server 130 may cryptographically hash the logging record to create a hashed logging record. Various hashing algorithms can be used. For example, the hashing algorithm can be a MD-5 algorithm. The hashing algorithm can be a RACE Integrity Primitives Evaluation Message Digest (RIPEMD-160) algorithm. The hashing algorithm can be a Secure Hash Algorithms (SHA) including SHA-0, SHA-1, SHA-2 and SHA-3. The hashing algorithm can be a Whirlpool algorithm based on the Advanced Encryption Standard.

At step 230, the server 130 may digitally sign the hashed logging record using a key to create a signed hashed logging record. The key can be managed by a hardware security module (HSM) of the server 130 which the client device (e.g., the second device 120) has access to for performing cryptographic functions, but not able to access the keys directly. In an embodiment, the hashed logging record can be signed with a public key embedded and obfuscated in the code of the transaction validation software program.

At step 235, the server 130 may store the signed hashed logging record to the database 140. The server 130 may also store the original logging record (i.e., the logging record prior to be hashed) to the database 140.

At step 240, the server 130 may transmit the signed hashed logging record to the first device 110. The server 130 may also transmit the original logging record (i.e., the logging record prior to be hashed) to the first device 110. The server 130 may further generate and transmit a heartbeat patten message or record to the first device 110.

With the signed hashed logging record, the first device 110 can determine whether the original logging record has been tampered with, so as to bill the correct fee for the transaction validation service provided by the server 130 to the card issuers (e.g., a card issuer associated with the second device 120). Further, with the heartbeat patten record, the first device 110 can determine the running status of the transaction validation service provided by the server 130, for example, whether the transaction validation service has been turned off or disrupted at some point of time.

FIG. 3 illustrates a flow chart of an example method 300 of generating transaction validation logging records according to an example embodiment. FIG. 3 may reference the same or similar components as those illustrated in FIGS. 1 and 2, including a first device, a server, a database, and a second device. The method 300 can be implemented in the system 100 and may include, but is not limited to the following steps.

The server 130 may be deployed with the transaction validation service software program for providing transaction validation service for card issuers. At step 305, the server 130 may receive from an entity a transaction validation request of validating a transaction. The entity can be a bank associated with the second device 120. The bank may issue contactless cards to its customers. The customers may use the contactless cards to conduct various transactions, such as online and/or offline shopping. When the second device 120 receive a transaction from a customer using the contactless card. The second device 120 may transmit the transaction validation request to the server 130.

At step 310, the server 130 may validate the transaction. The transaction validation request can include information about the contactless card used for the transaction. The validation can include validating a cryptogram generated by the contactless card when the transaction is being conducted. For example, the server 130 may generate a cryptogram and compare the generated cryptogram with the received cryptogram from the second device 120. The validation can also include validating an unique customer identifier associated with the contactless card.

At step 315, the server 130 may generate a logging record of the transaction validation. The logging record can include the transaction information, the contactless card information, the issuer of the contactless card, a monotonically increased number indicative of a sequence number of the transaction validation request, a timestamp indicative of a time at which the transaction validation request is being received and processed, and so forth.

At step 320, the server 130 may cryptographically hash the logging record to create a hashed logging record. Various hashing algorithms can be used including, but not limited to, MD-5 algorithm, RIPEMD-160 algorithm, SHA, and Whirlpool algorithm.

At step 325, the server 130 may digitally sign the hashed logging record using a key to create a signed hashed logging record. The hash can be signed by a private key or a public key and then verified by the corresponding key. The public key may be obfuscated in the code for the transaction validation service. When the code is packaged and shipped to the server 130, the code itself would be obfuscated, so that the public key would be difficult to find. The public key can be stored in parts and assembled by the code. In some embodiments, the transaction validation service may call out to a signing service to have the hashed logging record signed, such as a physical key.

The key can be managed by a hardware security module (HSM) of the server 130 which the client device (e.g., the second device 120) has access to for performing cryptographic functions, but not able to access the keys directly.

At step 330, the server 130 may store the signed hashed logging record to the database 140. The server 130 may also store the original logging record (i.e., the logging record prior to be hashed) to the database 140. The server 130 may further generate and store a heartbeat patten message or record to the database 140.

At step 335, the server 130 may transmit the signed hashed logging record to the first device 110. The server 130 may also transmit the original logging record (i.e., the logging record prior to be hashed) to the first device 110. The server 130 may further transmit the heartbeat patten message or record to the first device 110.

With the signed hashed logging record, the first device 110 can be allowed to verify that the original logging record is untampered with and that the original logging record is produced by the transaction validation service.

FIG. 4 illustrates a flow chart of an example method 400 of performing transaction validation and generating transaction validation records according to an example embodiment.

FIG. 4 may reference the same or similar components as those illustrated in FIGS. 1-3, including a first device, a server, a database, and a second device. The method 400 can be implemented in the system 100 and may include, but is not limited to the following steps.

A transaction validation service software program may be deployed on the server 130 for providing transaction validation service for card issuers. At step 405, the server 130 may receive from an entity a transaction validation request of validating a transaction. The entity can be a bank associated with the second device 120. The bank may issue contactless cards to its customers. The customers may use the contactless cards to conduct various transactions, such as online and/or offline shopping. When the second device 120 receive a transaction from a customer using the contactless card. The second device 120 may transmit the transaction validation request to the server 130.

At step 410, the server 130 may validate the transaction. The transaction validation request can include information about the contactless card used for the transaction. The validation can include validating a cryptogram generated by the contactless card when the transaction is being conducted. For example, the server 130 may generate a cryptogram and compare the generated cryptogram with the received cryptogram from the second device 120. The validation can also include validating an unique customer identifier associated with the contactless card.

At step 415, the server 130 may generate a logging record of the transaction validation. The logging record can include the transaction information, the contactless card information, the issuer of the contactless card, a monotonically increased number indicative of a sequence number of the transaction validation request, a timestamp indicative of a time at which the transaction validation request is being received and processed, and so forth.

At step 420, the server 130 may generate a monotonically increasing sequence number corresponding to the transaction validation request. The monotonically increasing sequence number can be used to label the sequence of the transaction validation request, such that missing transaction validation requests may be determined. The monotonically increasing sequence number may be a numerical number, such as 123, may be a set of letters such as ABC, may be roman numerals such as I, II, III, or combinations thereof. The server 130 can incorporate it into the logging record.

At step 425, the server 130 may cryptographically hash the logging record including the monotonically increasing sequence number to create a hashed logging record. Various hashing algorithms can be used including, but not limited to, MD-5 algorithm, RIPEMD-160 algorithm, SHA, and Whirlpool algorithm.

At step 430, the server 130 may digitally sign the hashed logging record using a key to create a signed hashed logging record. The hash can be signed by a private key or a public key and then verified by the corresponding key. The public key may be obfuscated in the code for the transaction validation service. When the code is packaged and shipped to the server 130, the code itself would be obfuscated, so that the public key would be difficult to find. The public key can be stored in parts and assembled by the code. In some embodiments, the transaction validation service may call out to a signing service to have the hashed logging record signed, such as a physical key.

The key can be managed by a hardware security module (HSM) of the server 130 which the client device (e.g., the second device 120) has access to for performing cryptographic functions, but not able to access the keys directly.

At step 435, the server 130 may store the signed hashed logging record to the database 140. The server 130 may also store the original logging record (i.e., the logging record prior to be hashed) including the monotonically increasing sequence number to the database 140.

At step 440, the server 130 may transmit the signed hashed logging record to the first device 110. The server 130 may also transmit the original logging record (i.e., the logging record prior to be hashed) including the monotonically increasing sequence number to the first device 110.

With the signed hashed logging record, the first device 110 can be allowed to verify that the original logging record is untampered with and that the original logging record is produced by the transaction validation service.

FIG. 5 illustrates a flow chart of an example method 500 of performing transaction validation and generating transaction validation records according to an example embodiment. FIG. 5 may reference the same or similar components as those illustrated in FIGS. 1-4, including a first device, a server, a database, and a second device. The method 500 can be implemented in the system 100 and may include, but is not limited to the following steps.

The transaction validation service may need to be monitored to ensure its proper operation. A heartbeat pattern record can be used to detect the anomaly of the transaction validation service. At a regular interval, a heartbeat pattern record would be produced whether or not any transaction validation had occurred. This can allow monitoring for the up time of the transaction validation service, in addition to how many transaction validations had occurred. For example, if transaction validations are redirected or the transaction validation service is turned off, that can be detected by looking at the frequency of these heartbeat pattern record. If there have an anomaly or a gap in the heartbeat records, and they are not at the regular interval, then the transaction validation service can be detected to have been down for some time. The heartbeat records are non-transactional heartbeat records that can be a part of the immutable hash-tree record. This way it can detect if transaction validations were just skipped, or if the server 130 on which the transaction validation service is deployed is continuously active. This heartbeat record can also include a monotonically increasing counter plus a timecode. This heartbeat record can be a record that is intrinsic to the transaction validation system itself (i.e., the server 130) and is not tied to a specific transaction and contains a timestamp. The heartbeat record occurs at a regular interval. The regular interval can be defined inside the heartbeat record itself or it can be something that is understood externally and implicit in the heartbeat record. For example, the interval can be operationally significant time frames, such as short enough to not represent a significant loss of traffic and long enough to not produce too much data.

At step 505, the server 130 may receive from an entity a transaction validation request of validating a transaction. The entity can be a bank associated with the second device 120. The bank may issue contactless cards to its customers. The customers may use the contactless cards to conduct various transactions, such as online and/or offline shopping. When the second device 120 receive a transaction from a customer using the contactless card. The second device 120 may transmit the transaction validation request to the server 130.

At step 510, the server 130 may validate the transaction. The transaction validation request can include information about the contactless card used for the transaction. The validation can include validating a cryptogram generated by the contactless card when the transaction is being conducted. For example, the server 130 may generate a cryptogram and compare the generated cryptogram with the received cryptogram from the second device 120. The validation can also include validating an unique customer identifier associated with the contactless card.

At step 515, the server 130 may generate a logging record of the transaction validation. The logging record can include the transaction information, the contactless card information, the issuer of the contactless card, a monotonically increased number indicative of a sequence number of the transaction validation request, a timestamp indicative of a time at which the transaction validation request is being received and processed, and so forth.

At step 520, the server 130 can generate a heartbeat pattern record indicative of the operation status of the server 130.

At step 525, the server 130 may cryptographically hash the logging record and/or the heartbeat pattern record to create a hashed logging record. Various hashing algorithms can be used including, but not limited to, MD-5 algorithm, RIPEMD-160 algorithm, SHA, and Whirlpool algorithm. In some embodiments, the server 130 may only cryptographically hash the logging record but not the heartbeat pattern record to create a hashed logging record.

At step 530, the server 130 may digitally sign the hashed logging record using a key to create a signed hashed logging record. The hash can be signed by a private key or a public key and then verified by the corresponding key. The public key may be obfuscated in the code for the transaction validation service. When the code is packaged and shipped to the server 130, the code itself would be obfuscated, so that the public key would be difficult to find. The public key can be stored in parts and assembled by the code. In some embodiments, the transaction validation service may call out to a signing service to have the hashed logging record signed, such as a physical key.

The key can be managed by a hardware security module (HSM) of the server 130 which the client device (e.g., the second device 120) has access to for performing cryptographic functions, but not able to access the keys directly.

At step 535, the server 130 may store the signed hashed logging record to the database 140. The server 130 may also store the original logging record (i.e., the logging record prior to be hashed) to the database 140. The server 130 may further store the heartbeat pattern record to the database 140.

At step 540, the server 130 may transmit the signed hashed logging record to the first device 110. The server 130 may also transmit the heartbeat pattern record to the first device 110.

The logging record can include a particular action or event that was called on the server 130 of the transaction validation service. It can include an event identification (ID), the type of event that happened, and any kind of metadata with that event. The event ID may indicate what type of event occurred, for example, a key validation has occurred. There may have metadata that is associated with that event, which can provide details about that event. Those details can include the details of the transaction itself. The metadata may also include which card issuer is using the transaction validation service.

In some embodiment, the event ID can be a snowflake ID. The snowflake ID is a way to generate a unique ID that is full ordered from a timestamp point but unique enough. That snowflake ID is generated by parallel systems that are not duplicated. Through the timestamp, event details can be obtained, such as when the event occurred, the event type, the transaction details, and the transaction validation result. Those details can then be hashed plus the previous record's hash. The hash can be signed by a private key or a public key and then verified by the corresponding key.

FIG. 6 illustrates a diagram showing an exemplary logging record. As shown in FIG. 6, a logging record may include a 'field' column 605, a 'type' column 610, and a 'description' column 615. The 'filed' column 605 can include fields: 'event ID,' 'timestamp,' 'eventType,' 'transactionDetails,' 'status,' and 'hash'. The 'type' column 610 can include: 'int64' that describes the type of the 'eventID,' 'timestamp' that describes the type of the 'timestamp,' 'string' that describes the type of the 'eventType,' 'object' that describes the type of the 'transactionDetails,' 'string' that describes the type of the 'status,' and 'string' that describes the type of the 'hash'. The 'description' column 610 can provide details about the items listed in the 'field' column 605. For example, the 'description' corresponding to the 'hash' can provide details about the 'hash': SHA256 of the previous row's (record's) hash plus this row's (record's) contents concatenated to a string.

In some aspects, the techniques described herein relate to a system of validating transactions, including a server including a memory and a processor, wherein the server is configured to: receive from an entity a transaction validation request of validating a transaction; validate the transaction; generate a logging record of the transaction validation; cryptographically hash the logging record to create a hashed logging record; digitally sign the hashed logging record using a key to create a signed hashed logging record; and transmit the signed hashed logging record to a computer device.

In some aspects, the techniques described herein relate to a system, wherein the key is a public key or a private key.

In some aspects, the techniques described herein relate to a system, wherein the public key is obfuscated.

In some aspects, the techniques described herein relate to a system, wherein the key is managed by a hardware security module of the server.

In some aspects, the techniques described herein relate to a system, wherein the entity digitally signs the hashed logging record using the key by accessing to the server.

In some aspects, the techniques described herein relate to a system, wherein the logging record includes a monotoni- cally increasing sequence number.

In some aspects, the techniques described herein relate to a system, wherein the logging record includes a hash of hashes of previous logging records.

In some aspects, the techniques described herein relate to a system, wherein the signed hashed logging record is transmitted to the computer device in real time.

In some aspects, the techniques described herein relate to a method of validating transactions performed by a server, including: receiving from an entity a transaction validation request of validating a transaction; validating the transaction; generating a logging record of the transaction validation; cryptographically hashing the logging record to create a hashed logging record; digitally signing the hashed logging record using a key to create a signed hashed logging record; and transmitting the signed hashed logging record to a computer device.

In some aspects, the techniques described herein relate to a method, wherein the signed hashed logging record is transmitted to the computer device in batch.

In some aspects, the techniques described herein relate to a method, wherein the signed hashed logging record is transmitted to the computer device through file logging service.

In some aspects, the techniques described herein relate to a method, wherein the signed hashed logging record is transmitted to the computer device through a messaging service.

In some aspects, the techniques described herein relate to a method, wherein the server is further configured to gen- erate a heartbeat-patterned message to monitor runtime of the server.

In some aspects, the techniques described herein relate to a method, wherein the heartbeat-patterned message includes timestamps indicating a time interval.

In some aspects, the techniques described herein relate to a method, wherein the logging record includes an event identity, event type information, a timestamp, and event details.

In some aspects, the techniques described herein relate to a non-transitory, computer-readable medium including instructions for validating transactions that, when executed on a computer arrangement, cause the computer arrange- ment to perform actions including: receiving from an entity a transaction validation request of validating a transaction; validating the transaction; generating a logging record of the transaction validation; cryptographically hashing the log- ging record to create a hashed logging record; digitally signing the hashed logging record using a key to create a signed hashed logging record; and transmitting the signed hashed logging record to a computer device.

In some aspects, the techniques described herein relate to a non-transitory, computer-readable medium, wherein the key is managed by a hardware security module of the server.

In some aspects, the techniques described herein relate to a non-transitory, computer-readable medium, wherein the logging record includes an event identity, event type infor- mation, a timestamp, and event details.

In some aspects, the techniques described herein relate to a non-transitory, computer-readable medium, wherein the logging record includes a hash of hashes of previous logging records.

In some aspects, the techniques described herein relate to a non-transitory, computer-readable medium, wherein the server is further configured to generate a heartbeat-patterned message to monitor runtime of the server.

As used herein, the term "transaction" can include, with- out limitation, financial transactions. However, it is under- stood that the term "transaction" is not limited thereto, and the present disclosure can include financial transactions, identity verification transactions, area access transactions, user authentication transactions, membership verification transactions, eligibility verification transactions, and any other operation involving a card.

In some examples, the present disclosure refers to a transaction involving a merchant or vendor, which may include, without limitation, retail merchants and vendors. However, it is understood that the term "merchant" is not limited thereto, and the present disclosure can include any type of merchant, vendor, or other entity involving in activities where products or services are sold or otherwise provided, either online, in a physical location, or both.

As used herein, the terms "entity" and "institution" can include, without limitation, financial institutions (e.g., a bank). However, it is understood that the terms "entity" and "institution" are not limited thereto, and the present disclo- sure can include individuals, corporations, state, local, and federal governments, and any other entity involved in trans- actions.

In some examples, exemplary procedures in accordance with the present disclosure described herein can be per- formed by a processing arrangement and/or a computer arrangement (e.g., a computer hardware arrangement). Such processing and/or computer arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a first device, a user device, a server, or other computer hardware arrangement. The computer arrangement herein can be the first device 110, the second device 120, and/or the server 130 in the system 100 of FIG. 1.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for validating transactions, comprising a server including a memory and a processor, wherein the server is configured to:

receive, from a second device, a transaction validation request of validating a transaction;

validate the transaction;

generate a logging record of the transaction validation;

cryptographically hash the logging record to create a hashed logging record;

assemble a public key from one or more parts of the public key;

digitally sign the hashed logging record using the public key to create a signed hashed logging record; and transmit, to a first device, the signed hashed logging record.

2. The system according to claim 1, wherein the public key is obfuscated.

3. The system according to claim 1, wherein the public key is managed by a hardware security module of the server.

4. The system according to claim 1, wherein an entity digitally signs the hashed logging record using the public key by accessing the server.

5. The system according to claim 1, wherein the logging record comprises a monotonically increasing sequence number.

6. The system according to claim 1, wherein the logging record comprises a hash of hashes of previous logging records.

7. The system according to claim 1, wherein the signed hashed logging record is transmitted to the first device in real time.

8. The system according to claim 2, wherein the public key is obfuscated in the code of a transaction validation service.

9. A method for validating transactions performed by a server, comprising:

receiving, from a second device, a transaction validation request of validating a transaction;

validating the transaction;

generating a logging record of the transaction validation;

cryptographically hashing the logging record to create a hashed logging record;

assembling a public key from one or more parts of the public key;

digitally signing the hashed logging record using the public key to create a signed hashed logging record; and transmitting, to a first device, the signed hashed logging record.

10. The method according to claim 9, wherein the signed hashed logging record is transmitted to the first device in batch.

11. The method according to claim 9, wherein the signed hashed logging record is transmitted to the first device through file logging service.

12. The method according to claim 9, wherein the signed hashed logging record is transmitted to the first device through a messaging service.

13. The method according to claim 9, wherein the server is further configured to generate a heartbeat-patterned message to monitor runtime of the server.

14. The method according to claim 13, wherein the heartbeat-patterned message comprises timestamps indicating a time interval.

15. The method according to claim 9, wherein the logging record comprises an event identity, event type information, a timestamp, and event details.

16. A non-transitory, computer-readable medium comprising instructions for validating transactions that, when executed on a computer arrangement, cause the computer arrangement to perform actions comprising:

receiving, from a second device, a transaction validation request of validating a transaction;

validating the transaction;

generating a logging record of the transaction validation;

cryptographically hashing the logging record to create a hashed logging record;

assembling a public key from one or more parts of the public key;

digitally signing the hashed logging record using the public key to create a signed hashed logging record; and transmitting, to a first device, the signed hashed logging record.

17. The non-transitory, computer-readable medium according to claim 16, wherein the public key is managed by a hardware security module.

18. The non-transitory, computer-readable medium according to claim 16, wherein the logging record comprises an event identity, event type information, a timestamp, and event details.

19. The non-transitory, computer-readable medium according to claim 16, wherein the logging record comprises a hash of hashes of previous logging records.

20. The non-transitory, computer-readable medium according to claim 16, wherein the actions further comprises generating a heartbeat-patterned message.

\* \* \* \* \*